United States Patent [19]
da Vitoria Lobo et al.

[11] Patent Number: 5,537,641
[45] Date of Patent: Jul. 16, 1996

[54] 3D REALTIME FLUID ANIMATION BY NAVIER-STOKES EQUATIONS

[75] Inventors: Niels da Vitoria Lobo; Chen Jinxiong, both of Orlando, Fla.

[73] Assignee: University of Central Florida, Orlando, Fla.

[21] Appl. No.: 158,442

[22] Filed: Nov. 24, 1993

[51] Int. Cl.$^6$ .................................................. G06T 17/00
[52] U.S. Cl. .......................................... 395/119; 395/152
[58] Field of Search ................................ 395/118, 119, 395/126, 152

[56] References Cited

U.S. PATENT DOCUMENTS

| | | | |
|---|---|---|---|
| 4,469,601 | 9/1984 | Beaver et al. | 210/658 |
| 4,809,202 | 2/1989 | Wolfram | 364/578 |
| 4,817,039 | 3/1989 | Frost | 364/420 |

OTHER PUBLICATIONS

Ji et al, "The Boundary Element Method For Boundary Control of Linear Stokes Flow", Decision and Control (1990).

Kenwright, et al, "A 3-D Streamline Tracking Algorithm Using Dual System Function," Visualizations (1992).

Haggard, et al "Computational Fluid Dynamics on the Transputer; System Organization and Performance," System Theory (1990).

Helman et al, "Surface Representations of Two-and Three-Dimensional Fluid Topologies", Visualizations (1990).

*Primary Examiner*—Almis R. Jankus
*Assistant Examiner*—Rudolph J. Buchel
*Attorney, Agent, or Firm*—Brian S. Steinberger

[57] ABSTRACT

This is a method for physically-based modeling of three dimensional (3D) general fluid animation in computer graphics. By solving the two dimensional (2D) Navier-Stokes equations using a Computational Fluid Dynamics method, we map it into 3D using the corresponding pressures in the fluid flow field. The method achieves realistic real-time fluid animation by solving the physical governing laws of fluids but avoiding the extensive 3D fluid dynamics computation. Unlike previous computer graphics fluid models, our approach can model many different fluid behaviors by changing the internal or external boundary conditions. It can also model different kinds of fluids by varying the Reynolds number. In addition, we have generated several ways to view the animation of fluid flow field, the streakline of the flow field and the blending of fluids of different colors. Our model can serve as a testbed to simulate many more fluid phenomena which have never been successfully modeled.

16 Claims, 8 Drawing Sheets

Figure 1: The staggered marker-and-cell mesh

Figure 2 illustrates a program flow chart for calculating state-to-state calculations Figure 3 illustrates the main program flowchart for 3D real-time animation Figure 4 illustrates an algorithm flowchart of the initialize graphics and parameters step of Fig. 3

Figure 5 illustrates an algorithm flowchart for updating parameters for the user interface Figure 6 illustrates the 3D drawing process

3D REALTIME FLUID ANIMATION BY NAVIER-STOKES EQUATIONS

The present invention relates generally to three dimensional (3D) visual animation, and more specifically to simulating 3D realtime fluid animation using pressure and velocity obtained from a two dimensional (2D) representation modelled by Navier-Stokes Equations. This application was funded in part from U.S. Army contract N61339-92-K-0001.

BACKGROUND OF THE INVENTION

Modelling fluid flow dynamics is helpful for designing structures such as but not limited to ship hulls, pipelines and airfoils. Thus, three-dimensional (3D) animation of fluid flow dynamics is necessary to represent for example, the flow of water past a ship's hull, fluid in a pipeline, fluid flow of air past an airfoil, or fluid in blood vessels.

Further, the movie and advertising industries, military and commercial training systems, virtual reality games and entertainment, and scientific research have been increasingly turning to 3D modeling to obtain realistic visual simulations of physical phenomena.

Present computer graphic processes can be used to model some behavioral characteristics of fluid flow but cannot model the 3D dynamics of flow, and the effects caused by the internal and external boundaries of the fluid flow.

Real-time animation of fluids is not available in existing systems where the movement of fluids on a graphical computer is calculated and animated at the same time. Real-time animation is difficult to achieve where calculations are intensive. Where the simulation calculations take so much time to occur on a computer, they cannot be completed in regular intervals of time at the pace of the physical process that is being simulated. Ideally, each frame in animation must be calculated fast enough in order to achieve real-time animation.

Thus, no present systems are known to exist that produce realistic looking 3D modeling and simulation of fluid flows in realtime.

Another problem with creating 3D animation in prior art systems is that layers of 2D grids(x,y) in the —z- axis must be attached to form a 3D grid. Calculations for the third dimension must be calculated at each node on each 2D grid in the z direction. These calculations are numerous, extensive and time consuming.

A further problem is that no one has been able to actually solve Navier-Stokes equations for 3D simulation using numerical methods calculated by computer in realtime.

Additional problem is that there is not a present system available for simulating physically realistic looking, yet real-time, visible surface behavior for fluid flows.

SUMMARY OF THE INVENTION

Accordingly it is an object of this invention to calculate fluid flow pressures from a two-dimensional representation and use these pressures to simulate the height of the fluid field to achieve a realtime simulation and animation in the third dimension.

Another object of the invention is to use physical laws to model natural and artificial fluid phenomena in computer graphics and animation.

In accordance, it is an object of this invention to produce 3D realtime fluid animation by solving equations that model a two-dimensional (2D) process using for example, the 2D Navier-Stokes equations.

Another object of the invention is to use a calculator based numerical method based on the corresponding pressures and velocities of 2D coordinates to produce the coordinate value of the third dimension.

Another object of this invention is to use computer graphics to produce 3D displays of the realtime fluid animation.

Another object of this invention is to be able to simulate different kinds of fluids in a realtime graphics simulation.

Another object of the invention is to simulate different kinds of fluids in realtime by varying properties such as the Reynolds number.

Another object of this invention is to be able to show a 3D display of the animation of the fluid flow field, the streakline of the flow field and the blending of fluids of different colors.

Another object of this invention is to simulate specific applications such as the effects of a motorized boat on a river, and blood within a vessel.

The file of this patent contains at least two drawings executed in color. Copies of this patent with color drawings will be provided by the Patent and Trademark Office upon request and payment of necessary fee.

DETAILED DESCRIPTION OF THE INVENTION

Before explaining the disclosed embodiments of the present invention in detail it is to be understood that the invention is not limited in its application to the details of the particular arrangements shown since the invention is capable of other embodiments. Also the terminology used herein is for purpose of description and not of limitation.

Navier-Stokes Equations

A means of describing mathematically fluid flow at any point is by Navier-Stokes equations. These equations can be found in many fluid mechanics books such as Potter, M. C. and Wiggert, D. C., *Mechanics of Fluids*, Prentice Hall Inc. 1991. These equations are the equivalent of Newton's second law in fluid dynamics.

Navier-Stokes equations include:

$$\rho^* \frac{Du}{Dt} = -\frac{\partial p}{\partial x} + \mu^* \left( \frac{\partial^2 u}{\partial x^2} + \frac{\partial^2 u}{\partial y^2} + \frac{\partial^2 u}{\partial z^2} \right) + \rho^* g_x$$

-continued $$\rho^* \frac{Dv}{Dt} = -\frac{\partial p}{\partial y} + \mu^* \left( \frac{\partial^2 v}{\partial x^2} + \frac{\partial^2 v}{\partial y^2} + \frac{\partial^2 v}{\partial z^2} \right) + \rho^* g_y$$

$$\rho^* \frac{Dw}{Dt} = -\frac{\partial p}{\partial z} + \mu^* \left( \frac{\partial^2 w}{\partial x^2} + \frac{\partial^2 w}{\partial y^2} + \frac{\partial^2 w}{\partial z^2} \right) + \rho^* g_z$$

where $$\frac{D}{Dt} = u^* \frac{\partial}{\partial x} + v^* \frac{\partial}{\partial y} + w^* \frac{\partial}{\partial z} + \frac{\partial}{\partial t},$$

$$u = \frac{dx}{dt},$$

is velocity in the direction of the x axis represented as meter per second=m/s.

$$v = \frac{dy}{dt},$$

is velocity in the direction of the y axis represented as meter per second=m/s.

$$w = \frac{dz}{dt},$$

is velocity in the direction of the z axis represented as meter per second=m/s.

μ is the viscosity of the fluid represented as newton-sec per square meter=N*S/m².

p is the pressure of the fluid represented as newton per square meter=N/m²

ρ is the density of the fluid represented as kilogram per cubic meter=kg/m³ gx, gy, gz are the gravity accelerations represented as meter per square second=m/s².

The units given above are for example only and can be modified for particular uses.

The differential continuity equation is derived from the conservation of mass as follows:

$$\frac{\partial u}{\partial x} + \frac{\partial v}{\partial y} + \frac{\partial w}{\partial z} = 0$$

Equation (1) is a compact form of the differential continuity equation.

$$\nabla \cdot v = 0 \tag{1}$$

$\nabla$ represents the rate of change along the three dimensions x, y, z.

v represents the vector form of the velocities along the x, y and z axes combined.

"." represents the scalar dot product.

v=u*i+v*j+w*k $$\nabla \cdot v = \left( \frac{\partial}{\partial x} *i + \frac{\partial}{\partial y} *j + \frac{\partial}{\partial z} *k \right) \cdot$$

$$(u*i + v*j + w*k) = \frac{\partial u}{\partial x} + \frac{\partial v}{\partial y} + \frac{\partial w}{\partial z} = 0$$

i represents the unit vector along the x-axis, j represents the unit vector along the y-axis, and k represents the unit vector along the z-axis.

The differential continuity equation is used together with Navier-Stokes equations to decide the relationships between motion and pressure.

Navier-Stokes equations can be rewritten into a dimensionless form, which is a form that has no units. The units are dropped by selecting characteristic quantities that best describe the particular problem of interest that is being modelled.

In fluid mechanics, Navier-Stokes equations are put into equation (2) as compact form:

$$\rho \frac{Dv}{Dt} = -\nabla p + \rho g + \mu \Delta^2 v, \tag{2}$$

where $$\nabla^2 = \frac{\partial^2}{\partial x^2} + \frac{\partial^2}{\partial y^2} + \frac{\partial^2}{\partial z^2}$$

$\nabla^2$ represents the rate of change of the rate of change. If we choose t'=t/(L/V), v'=v/V, p'=p/(ρV²), $\nabla$'=L$\nabla$ where L, V and ρ are constant and average length, velocity and density respectively. Then equation (2) becomes as follows:

$$\rho \frac{VDv'}{L/VDt'} = -\rho \frac{V^2}{L} \nabla' p' + \rho g + \frac{\mu V}{L^2} \nabla'^2 v'$$

that is:

$$\frac{Dv'}{Dt'} = -\nabla' p' + \frac{L}{V^2} g + \frac{\mu}{\rho V L} \nabla'^2 v'$$

If we disregard the gravity g, drop the prime for simplicity and define Reynolds number as $$Re = \frac{\rho V L}{\mu},$$

which combined with the previous, reduces equation (2) to equation (3) as:

$$\frac{\partial v}{\partial t} + A(v) + \nabla p = \frac{1}{Re} \nabla^2 v \tag{3}$$

where $$A(v) = u \frac{\partial v}{\partial x} + v \frac{\partial v}{\partial y} + w \frac{\partial v}{\partial z}$$

and, Re is the Reynolds number which is a parameter that indicates the flow regime of the fluid. The fluid flow regime is the nature of the fluid flow or the result of the properties that control the fluid flow. For example, the regime can be laminar or turbulent. The Reynolds number is a key parameter which controls the behavior of the fluid flow, thus it indicates the fluid flow regime.

Re is defined as =

$$\frac{VL}{v}$$

where L and V are a characteristic length and velocity, respectively, and v is the kinematic viscosity, i.e., $$v = \frac{\mu}{\rho}.$$

For example, given a fluid flow inside a pipe, then L can be the diameter of the pipe and V is the velocity of the fluid flow inside the pipe. If the Reynolds number is relatively small, the fluid is viscous and the flow regime is laminar; if it is large, the flow regime is turbulent.

In a laminar flow, the fluid flows with no significant mixing of neighboring fluid particles. If dye were injected into the flow, it would not mix with the neighboring fluid except by molecular activity. The appearance of the fluid surface is smooth when the flow is laminar. The contrary of laminar flow is turbulent flow.

Discretization

Discretization is the process of representing a continuous mathematical function by a collection of specific values of the function. For example, one can represent the function that describes the shape of a geodesic dome by the collection of nodal points in the triangulation for the dome.

Discretization is a common method used in the solutions of continuous differential equations by numerical computer procedures. A good descritization will result in numerically accurate results and stability of the computation.

Several approaches are known in Computational Fluid Dynamics to solve the Navier-Stokes equations. Peyret, R. and Taylor, T. D., *Computational Methods for Fluid Flow*, Springer-Verlag New York Inc. 1985, describes a finite-difference solution such as a penalization method that can be used to substitute for the divergence equation (1) listed above. The finite-difference solution is a method to discretize and calculate the quantities described by mathematical equations on computers. In this solution technique, derivatives are approximated by differences of the values at adjacent nodes that are a finite distance apart instead of being infinitesimally close. A penalization method is a method that when errors arise, certain numbers in the calculation are added, subtracted, multiplied or divided in order to correct the errors. This finite-difference solution makes use of equation (4).

$$\epsilon * p + \nabla \cdot v = 0, \quad (4)$$

Where $\epsilon$ is typically a very small number which is always greater than zero but smaller than 1.

The Peyret et al. publication states that the solution of equations (3) and (4) tends toward the solution of Navier-Stokes equations, i.e., (1) and (2), when e is a very small number. In our program we set $\epsilon = 0.005$. A smaller e may cause the calculations to be unstable.

Figure 1:
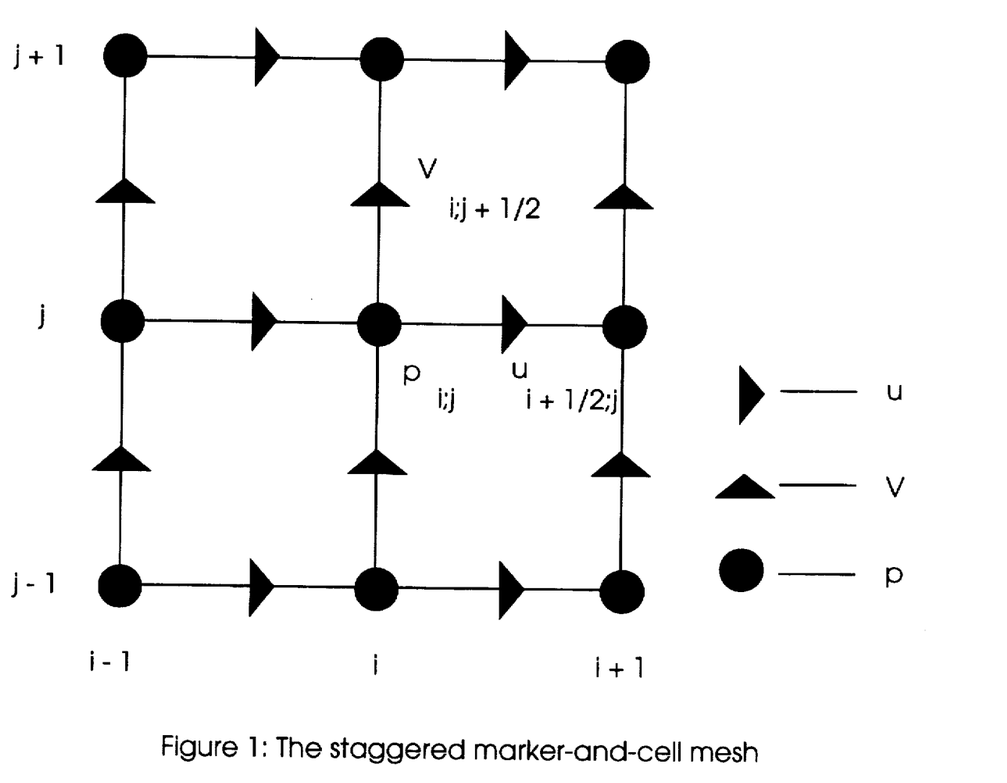
FIG. 1 illustrates a staggered marker-cell mesh for the arrangement of a fluid flow field.

The spatial discretization of equations (3) and (4) in two dimension(2D) makes use of the staggered marker-and-cell mesh grid illustrated in FIG. 1. FIG. 1 illustrates a staggered marker-cell mesh for the arrangement of a fluid flow field. The nodes of the mesh represent positions in the 2D map at which the fluid's behavior will be simulated. This mesh may be thought of as corresponding for example to points lying along horizontal plane. Using this mesh, the computation of taking derivatives is easy and is approximated by merely subtracting values for two or more adjacent nodes as needed.

An example of an explicit discretization is as follows:

$$u^{n+1}_{i+1/2,j} = \left( u^n_{i+1/2,j} - a^n_{i+1/2,j} - \Delta_x^1 p^n_{i+1/2,j} + \frac{1}{Re} \nabla_h^2 u^n_{i+1/2,j} \right) * \Delta t \quad (5)$$

$$v^{n+1}_{i,j+1/2} = \left( v^n_{i,j+1/2} - b^n_{i,j+1/2} - \Delta_y^1 p^n_{i,j+1/2} + \frac{1}{Re} \nabla_h^2 v^n_{i,j+1/2} \right) * \Delta t \quad (6)$$

$$p^{n+1}_{i,j} = (\Delta_x^1 u^{n+1}_{i,j} + \Delta_y^1 v^{n+1}_{i,j})/\epsilon \quad (7)$$

where i, j are mesh coordinates, n represent current state and n+1 represent next state after $\Delta t$ time slice. "$\epsilon$" is typically a small number which is always greater than zero but smaller than 1. The difference operators $\Delta_x^1$, $\Delta_y^1$, and $\nabla_h^2$ are defined by $$\Delta_x^1 f_{l,m} = \frac{1}{\Delta x} (f_{l+1/2,m} - f_{l-1/2,m}) \quad (8)$$

$$\Delta_y^1 f_{l,m} = \frac{1}{\Delta y} (f_{l,m+1/2} - f_{l,m-1/2}) \quad (9)$$

$$\nabla_h^2 f_{l,m} = \Delta_{xx} f_{l,m} + \Delta_{yy} f_{l,m} \quad (10)$$

$$\Delta_{xx} f_{l,m} = \frac{f_{l+1,m} - 2f_{l,m} + f_{l-1,m}}{\Delta x^2} \quad (11)$$

$$\Delta_{yy} f_{l,m} = \frac{f_{l,m+1} - 2f_{l,m} + f_{l,m-1}}{\Delta y^2} \quad (12)$$

where f means either u, v or p referred in equations (5), (6) and (7) above. The terms l and m are arbitrary coordinates in 2D (two-dimensions) and can be for example i+½, j−½, etc.

The terms $a^n_{i+1/2,j}$ and $b^n_{i,j+1/2}$ are the approximations of $$u \frac{\partial u}{\partial x} + v \frac{\partial u}{\partial y} + w \frac{\partial u}{\partial z} \text{ and } u \frac{\partial v}{\partial x} + v \frac{\partial v}{\partial y} + w \frac{\partial v}{\partial z}$$

as defined in equation (3). These are discretized as follows:

$$a^n_{i+1/2,j} = u^n_{i+1/2,j} \Delta_x^0 u^n_{i+1/2,j} + V^n_{i+1/2,j} \Delta_y^0 u^n_{i+1/2,j} \quad (13)$$

$$b^n_{i,j+1/2} = U^n_{i,j+1/2} \Delta_x^0 v^n_{i,j+1/2} + v^n_{i,j+1/2} \Delta_y^0 v^n_{i,j+1/2} \quad (14)$$

where $$U_{i,j+1/2} = \frac{1}{4} (u_{i+1/2,j} + u_{i+1/2,j+1} + u_{i-1/2,j+1} + u_{i-1/2,j}) \quad (15)$$

$$V_{i+1/2,j} = \frac{1}{4} (v_{i+1,j+1/2} + v_{i,j+1/2} + v_{i,j-1/2} + v_{i+1,j-1/2}) \quad (16)$$

$$\Delta_x^0 f_{l,m} = \frac{1}{2\Delta x} (f_{l+1,m} - f_{l-1,m}) \quad (17)$$

$$\Delta_y^0 f_{l,m} = \frac{1}{2\Delta y} (f_{l,m+1} - f_{l,m-1}) \quad (18)$$

The above approximations are of second-order accuracy. Second-order accuracy holds when given a continuous function f(x), the error involved in calculating $$\frac{df(x_i)}{dx} \text{ by } \frac{f_{i+1} - f_{i-1}}{\Delta x}$$

is no greater than $(\Delta x)^2$ multiplied by a constant, K, whose value may depend on the application.

Figure 2:
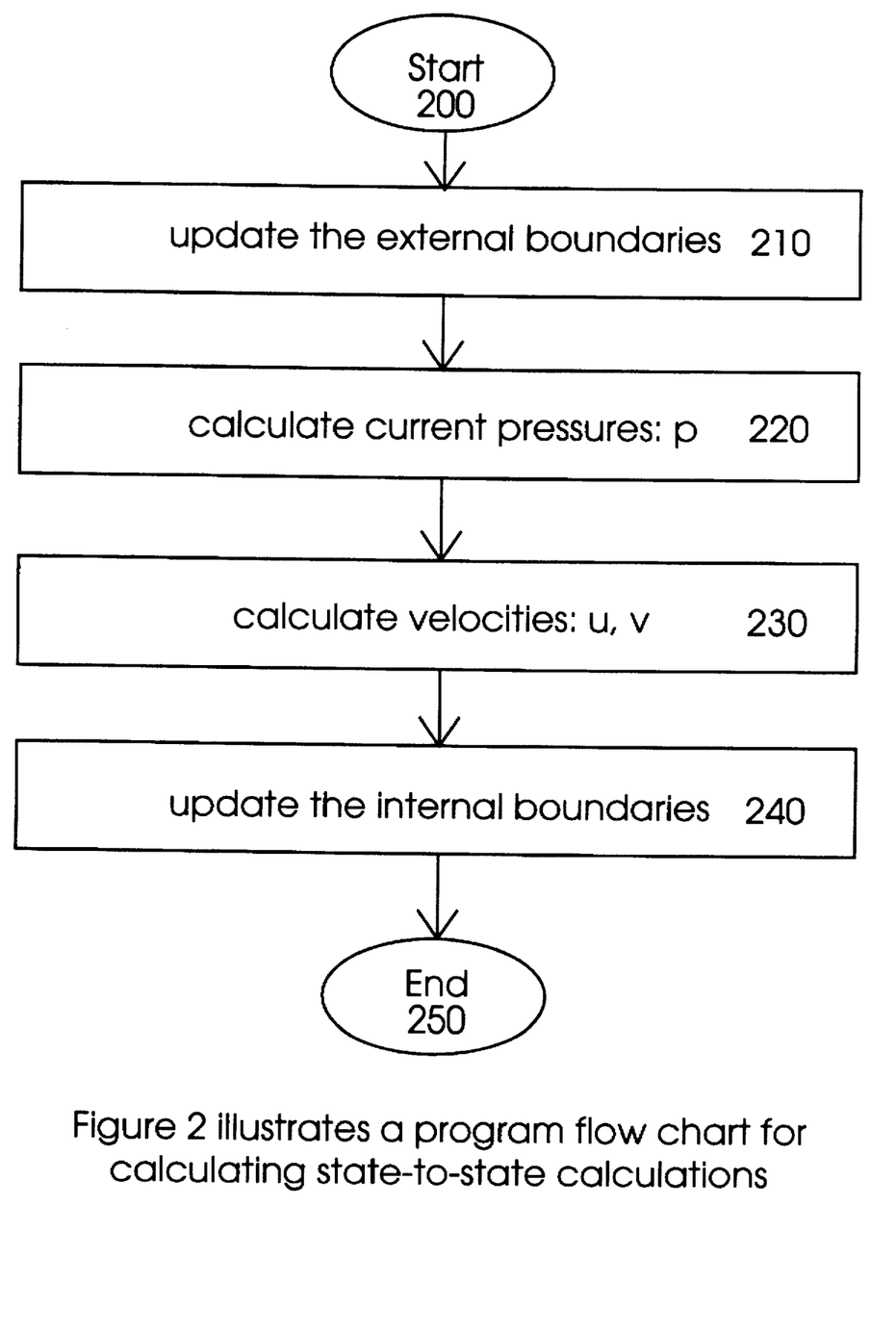
FIG. 2 illustrates an algorithm flow chart for calculating state-to-state calculations of current pressure and velocities.

The algorithm to compute the Navier-Stokes equations is illustrated in FIG. 2. The fluid flow field is the area representing the fluid flow. The field is usually composed of fluid velocity vectors and pressures. Sometimes the field is referred to as fluid field or velocity field. The known current state of the velocity vectors and pressures of the fluid flow field is represented by: $u^n_{i+1/2, j}$, $v^n_{i,j+1/2}$ and $p^n_{i,j}$.

The next state in the field is represented by: $u^{n+1}_{i+1/2,j}$, $v^{n+1}_{i,j+1/2}$ and $p^{n+1}_{i,j}$ after $\Delta t$ time is calculated by equations (5), (6), and (7).

Equations (5), (6) and (7) are implemented by employing functional equations (8) through (18) above. This process goes on and on from current state to next state, and from next state to next next state. FIG. 2 illustrates a program flow chart for the outline of these state calculations employing also internal and external boundary conditions.

The boundaries of the fluid flow field decide the behavior of the fluid flow and are divided into internal and external boundaries. External boundaries usually represent the borders holding the fluid such as but not limited to a riverbank or a flexible wall such as a flexible plastic gutter. Other external boundaries can be the walls of a blood vessel. Internal boundaries are usually types of obstructions in the fluid flow such as but not limited to islands or posts in the river flow, or moving obstacles such as a moving boat. Internal obstacles do not have to be rigid and can include such diverse elements as balloons or flexible tubing in the ocean and known obstacles in a blood vessel. Objects can be perceptable by any sense or possibly not, as long as the object is intelligible or peceptable by the mind such as air, electromagnetic radiation, etc.

FIG. 2 begins at 200 which is to start calculating the next state. Next, the external boundary conditions are calculated at block 210, by taking the current exiting fluid velocity vectors and pressures along the external boundary conditions which can be along the banks of the fluid. Next, the pressures (p) are calculated using the exiting fluid velocity vectors at block 220. Next, the velocity vectors u, v are calculated at block 230 by using the existing velocity vectors and pressures. The next step is to update the internal boundary conditions. For example, if a boat drifting in a river is to be simulated, then the position of the boat in the fluid flow field is update relative to the boundary. Finally, at step 240 the current state is finished being calculated.

The following simplified procedure is exerted from our program:

```
stateFluid( )
{
int ii, ii, kk;
/* kk is the flag indicating last time slice matrix */
kk = currentFluid;
/* process the next fluid matrix, next time slice */
currentFluid = (currentFluid + 1) % 2;
/* calculate the external boundary condition */
calcExtBoundary(kk);
/* calculate the pressure */
calcPressure(kk);
/* calculate the fluid velocity fields */
for (ii=2; ii<X-3; ii=ii+2)
for (jj=2; jj<Y-3; jj=jj+2) {
    u[ii+1][jj][currentFluid] = u[ii+1][jj][kk]
        - funca(ii+1, jj, kk)*dt
        - deltax1(p, ii+1, jj, currentFluid)*dt
        + atledh2(u, ii+1, jj, kk)*dt/Re;
    v[ii][jj+1][currentFluid] = v[ii][jj+1][kk]
        - funcb(ii, jj+1, kk)*dt
        - deltay1(p, ii, jj+1, currentFluid)*dt
        + atledh2(v, ii, jj+1, kk)*dt/Re;
/* calculate the internal boundary condition */
calcIntBoundary(ii, jj, currentFluid}
```

3D Real-time Animation

Figure 3:
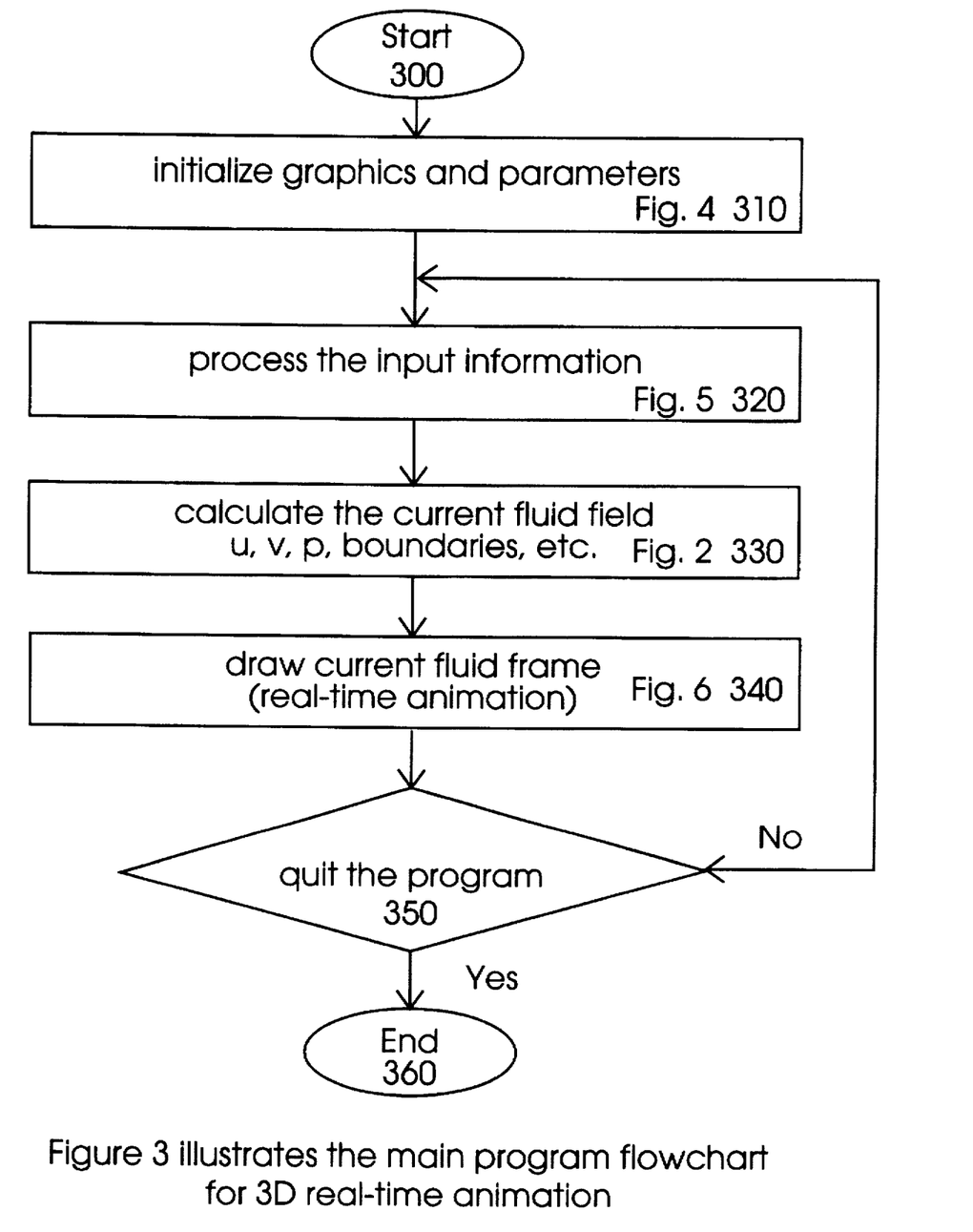
FIG. 3 illustrates an algorithm flow chart for 3D realtime simulation of fluids.

After calculating each state of the velocity vectors and pressures of the fluid flow field, the current frame of velocity field can be drawn. For a given grid (i, j) in the flow field, $$u_{i,j} = \frac{u_{i+1/2,j} + u_{i-1/2,j}}{2}$$

$$v_{i,j} = \frac{v_{i,j+1/2} + v_{i,j-1/2}}{2}$$

a velocity vector from (i, j) to (i+ui;j, j+vi;j) can be drawn. By raising the grid (i, j) in the third dimension to the scale of pi;j, a 3D fluid surface can then be drawn. Therefore as the real-time calculation and drawing go on, we achieve an animation of velocity vectors of the fluid flow field. FIG. 3 illustrates our main program flow chart for 3D realtime animation.

FIG. 3 starts the fluid simulation at 300. The next step is to initialize graphics and parameters at 310 in order to start calculating and drawing fluids for the simulation. Step 310 is explained by FIG. 4. The next step in FIG. 3 occurs at block 320 to process any keyboard or other input information which might change the color, velocity, viscosity or any other parameters which might affect the simulation of the fluids. The details of step 320 are illustrated in FIG. 5. The next step in FIG. 3 occurs at block 330 to calculate the current fluid field velocities, pressures and boundaries, which was described in reference to FIG. 2. The next step in FIG. 3 occurs at block 340, which is to draw the current field by raising the heights of the 2D grids proportional to the corresponding pressures at the grids. The details of step 340 are described in FIG. 6. The next step in FIG. 3 is at block 350, where if more simulation is needed, then the program runs through steps 320, 330, and 340 again to stimulate the next state. The simulation program ends at block 360.

The following program is exerted from our program.

```
main ( )
{
    /* initialize graphics and parameters */
    initilize( );
    /* iterate and animate the fluid */
    while (TRUE) {
        /* process the input information */
        processStateInput( );
        /* calculate the current fluid field */
        stateFluid( );
        /* animate the fluid */
        drawFluid( );}
```

Initialize Graphics and Parameters

The graphics library initialization is a low level operation that is hardware dependent and often needs reference manuals to implement that are well known. For example, a silicon-graphics indigo or reality-engine are well known.

Figure 4:
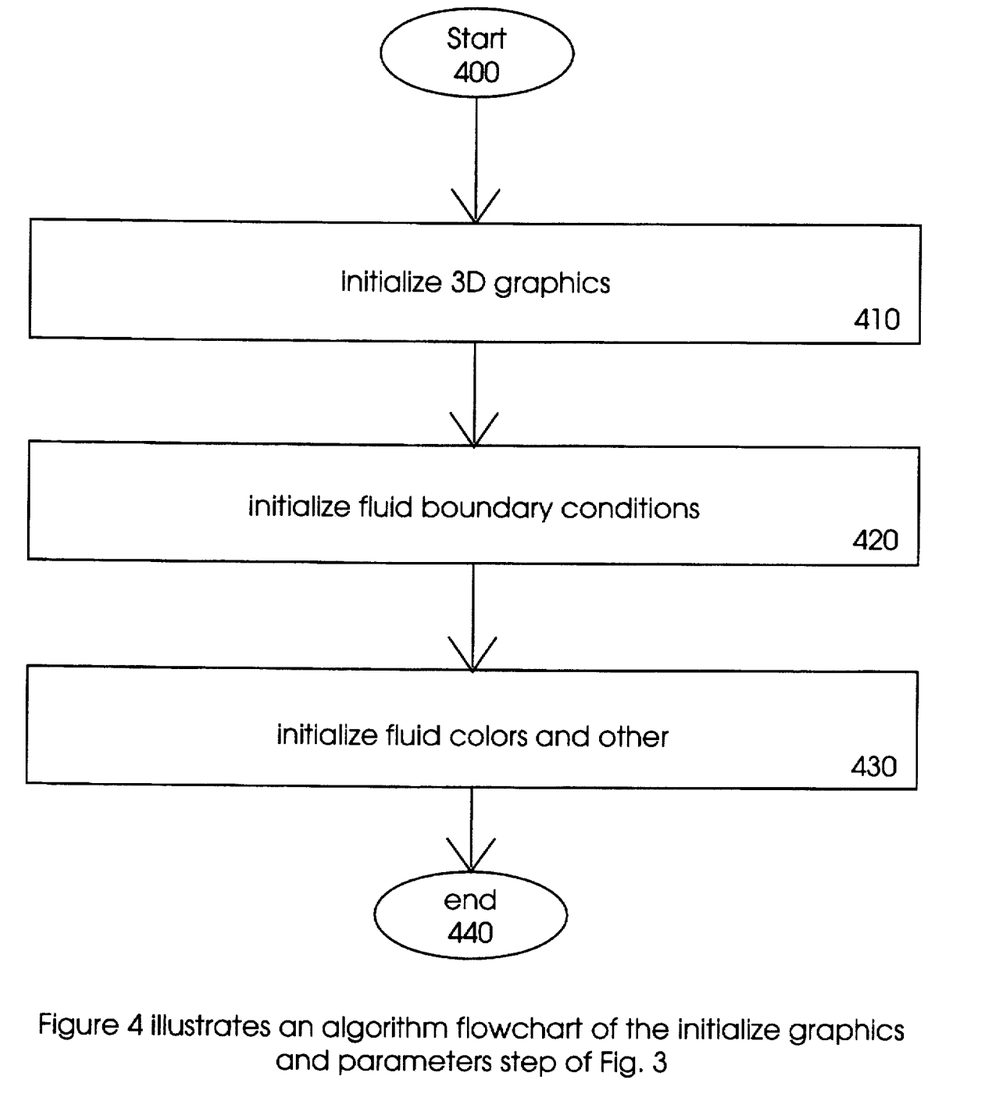
FIG. 4 illustrates an algorithm flow chart of the process for initializing the 3D Graphics and boundary conditions.
Figure 5:
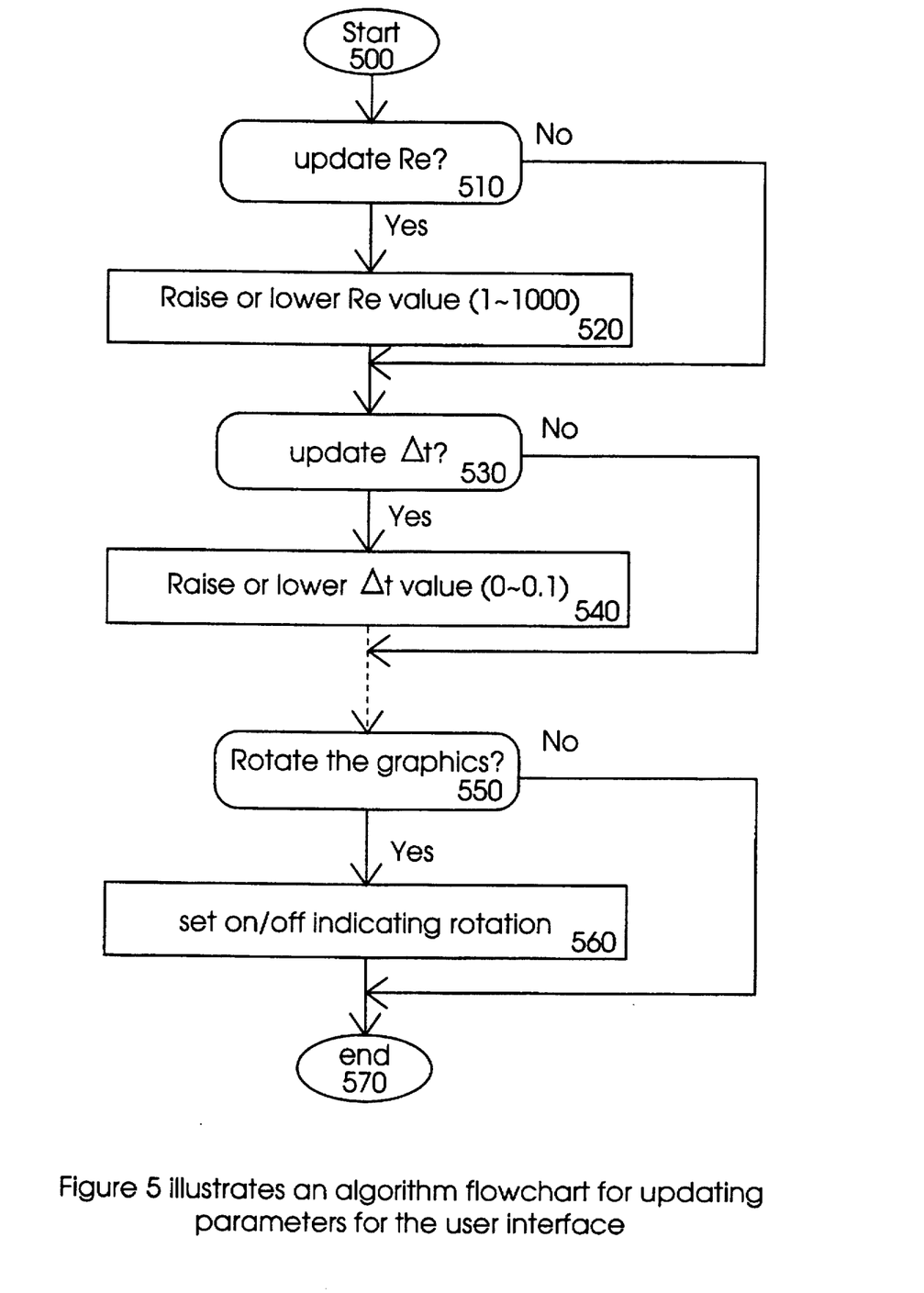
FIG. 5 illustrates an algorithm flow chart for updating the parameters by user interface.

The program flow chart of the initialize process is illustrated in FIG. 4.

After starting at element 400 in FIG. 4, the 3D graphics are initialized at block 410 by calling system graphics initialize functions. For example, initialize 3D graphics drawings, etc. The next step is to initialize fluid boundary conditions at block 420 where boundary conditions of the fluid are set to the simulation desired. For example, if you input the velocity in the x- direction (u) to be one, and velocity in the y direction (v) to be zero, a channel flow appears in the x-direction. The next step in FIG. 4 occurs at block 430, where the user initializes the color of fluid desired, objects to be put into the fluid, etc. Finally, the flowchart ends at block 440.

Process the Input Information

The parameters Re, $\epsilon$, $\Delta x$, $\Delta y$, and $\Delta t$ can be updated by user interface (keyboard). One can also tell the system to rotate the viewing direction to the fluid, to scale the height of the fluid, etc. The inputs in the user interface flowchart is illustrated in FIG. 5.

In FIG. 5, keyboard input is utilized to update Reynolds numbers simulation time slice, artificial parameter $\epsilon$, etc. For example, an Re value already exists at box 500. If you desire to change your Re value, then action to change the Re value is detected at box 510 and the new value is input at box 520. After input of the Reynolds number, then check next input at box 530. If you have no desire to change the Re value, then the control input checking will go from box 510 to 530. A similar action takes place for the other user inputs shown in boxes 530 through 570.

Draw Current Fluid Frame

Figure 6:
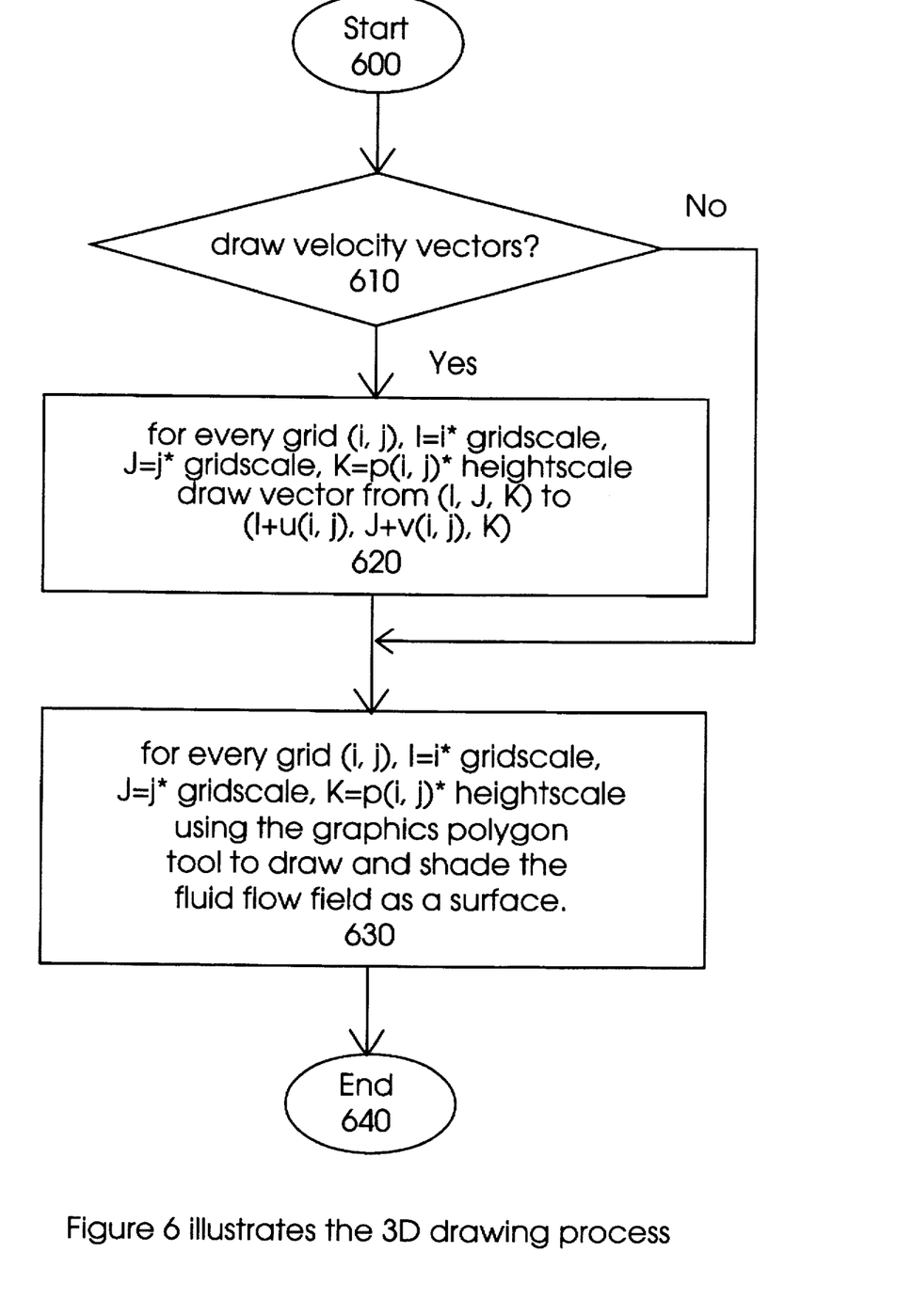
FIG. 6 illustrates an algorithm flow chart for the 3D drawing process.

FIG. 6 illustrates an algorithm flow chart for the 3D drawing process. FIG. 6 uses the pressure to draw the height of the fluid surface, which is the third dimension. Grid (i,j) is raised to a certain scale of the pressure which effects a realistic picture of the fluid flow surface.

The procedure segment which draws the 3D fluid surface is as follows:

```
for (i=2; i<X-5; i=i+2)
for (j=2; j<Y-5; j=j+2) {
    bgnpolygon( );
        vertex[i][j].x = i*gridScale;
        vertex[i][j].y = j*gridScale;
        vertex[i][j].z = pressure[i][j]*hightScale;
        vertex[i+2][j].x = i*gridScale;
        vertex[i+2][j].y = j*gridScale;
        vertex[i+2][j].z = pressure[i+2][j]*hightScale;
        vertex[i+2][j+2].x = i*gridScale;
        vertex[i+2][j+2].y = j*gridScale;
        vertex[i+2][j+2].z = pressure[i+2][j+2]*hightScale;
        vertex[i][j+2].x = i*gridScale;
        vertex[i][j+2].y = j*gridScale;
        vertex[i][j+2].z = pressure[i][j+2]*hightScale;
    endpolygon}
```

Results of Two Step Simulations of a 5×5 Fluid Flow Field

A given boundary condition of a channel flow is simulated as follows: void initFluid()

```
{
    int i, j, k;

/* generate initial fluid matrix and boundary conditions */
    for (i=0; i<X; i++)
    for (j=0; j<Y; j++)
    for (k=0; k<Z; k++) { u[i][j][k] = 0;
        if (i==1)
            u[i][j][k] = (Y-j)*j/Y;
        v[i][j][k] = 0;
        p[i][j][k] = 0;}}
```

Several frames of the calculations of a 5×5 velocity u(i,j), v(i,j) and pressure field p(i,j) along two dimensions (i,j), are simulated as follows:

```
*********** initial and boundary conditions *************
u[0][0] = 0.000000, v[2][0] = 0.000000, p[2][0] = 0.000000
u[0][2] = 1.000000, v[2][2] = 0.000000, p[2][2] = 0.000000
u[0][4] = 2.000000, v[2][4] = 0.000000, p[2][4] = 0.000000
u[0][6] = 2.000000, v[2][6] = 0.000000, p[2][6] = 0.000000
u[0][8] = 1.000000, v[2][8] = 0.000000, p[2][8] = 0.000000 u[2][0] = 0.000000, v[2][0] = 0.000000, p[2][0] = 0.000000
u[2][2] = 0.000000, v[2][2] = 0.000000, p[2][2] = 0.000000 u[2][4] = 0.000000, v[2][4] = 0.000000, p[2][4] = 0.000000
u[2][6] = 0.000000, v[2][6] = 0.000000, p[2][6] = 0.000000
u[2][8] = 0.000000, v[2][8] = 0.000000, p[2][8] = 0.000000 u[4][0] = 0.000000, v[4][0] = 0.000000, p[4][0] = 0.000000
u[4][2] = 0.000000, v[4][2] = 0.000000, p[4][2] = 0.000000
u[4][4] = 0.000000, v[4][4] = 0.000000, p[4][4] = 0.000000
u[4][6] = 0.000000, v[4][6] = 0.000000, p[4][6] = 0.000000
u[4][8] = 0.000000, v[4][8] = 0.000000, p[4][8] = 0.000000 u[6][0] = 0.000000, v[6][0] = 0.000000, p[6][0] = 0.000000
u[6][2] = 0.000000, v[6][2] = 0.000000, p[6][2] = 0.000000
u[6][4] = 0.000000, v[6][4] = 0.000000, p[6][4] = 0.000000
u[6][6] = 0.000000, v[6][6] = 0.000000, p[6][6] = 0.000000
u[6][8] = 0.000000, v[6][8] = 0.000000, p[6][8] = 0.000000 u[8][0] = 0.000000, v[8][0] = 0.000000, p[8][0] = 0.000000
u[8][2] = 0.000000, v[8][2] = 0.000000, p[8][2] = 0.000000
u[8][4] = 0.000000, v[8][4] = 0.000000, p[8][4] = 0.000000
```

-continued

```
u[8][6] = 0.000000, v[8][6] = 0.000000, p[8][6] = 0.000000
u[8][8] = 0.000000, v[8][8] = 0.000000, p[8][8] = 0.000000

================= time 0 =================
u[2][2] = 0.000000, v[2][2] = 0.000000, p[2][2] = 0.000000
u[2][4] = 0.000000, v[2][4] = 0.000000, p[2][4] = 0.000000
u[2][6] = 0.000000, v[2][6] = 0.000000, p[2][6] = 0.000000
u[4][2] = 0.000000, v[4][2] = 0.000000, p[4][2] = 0.000000
u[4][4] = 0.000000, v[4][4] = 0.000000, p[4][4] = 0.000000
u[4][6] = 0.000000, v[4][6] = 0.000000, p[4][6] = 0.000000
u[6][2] = 0.000000, v[6][2] = 0.000000, p[6][2] = 0.000000
u[6][4] = 0.000000, v[6][4] = 0.000000, p[6][4] = 0.000000
u[6][6] = 0.000000, v[6][6] = 0.000000, p[6][6] = 0.000000

================= time 1 =================
u[2][2] = 0.050001, v[2][2] = -0.050000, p[2][2] = 100.000000
u[2][4] = 0.100002, v[2][4] = -0.050000, p[2][4] = 200.000000
u[2][6] = 0.100002, v[2][6] = 0.100000, p[2][6] = 200.000000
u[4][2] = 0.050001, v[4][2] = 0.000000, p[4][2] = 0.000000
u[4][4] = 0.100002, v[4][4] = 0.000000, p[4][4] = 0.000000
u[4][6] = 0.100002, v[4][6] = 0.000000, p[4][6] = 0.000000
u[6][2] = 0.000000, v[6][2] = 0.000000, p[6][2] = 0.000000
u[6][4] = 0.000000, v[6][4] = 0.000000, p[6][4] = 0.000000
u[6][6] = 0.000000, v[6][6] = 0.000000, p[6][6] = 0.000000

================= time 2 =================
u[2][2] = 0.345016, v[2][2] = -0.074999, p[2][2] = 109.999840
u[2][4] = 0.660058, v[2][4] = -0.064999, p[2][4] = 159.999680
u[2][6] = 0.650060, v[2][6] = 0.179999, p[2][6] = 139.999680
u[4][2] = 0.105017, v[4][2] = -0.010000, p[4][2] = 20.000334
u[4][4] = 0.180058, v[4][4] = -0.010000, p[4][4] = 40.000668
u[4][6] = 0.170060, v[4][6] = 0.020001, p[4][6] = 40.000668
u[6][2] = 0.010000, v[6][2] = 0.000000, p[6][2] = 0.000000
u[6][4] = 0.020001, v[6][4] = 0.000000, p[6][4] = 0.000000
u[6][6] = 0.020001, v[6][6] = 0.000000, p[6][6] = 0.000000
```

Figure 7:
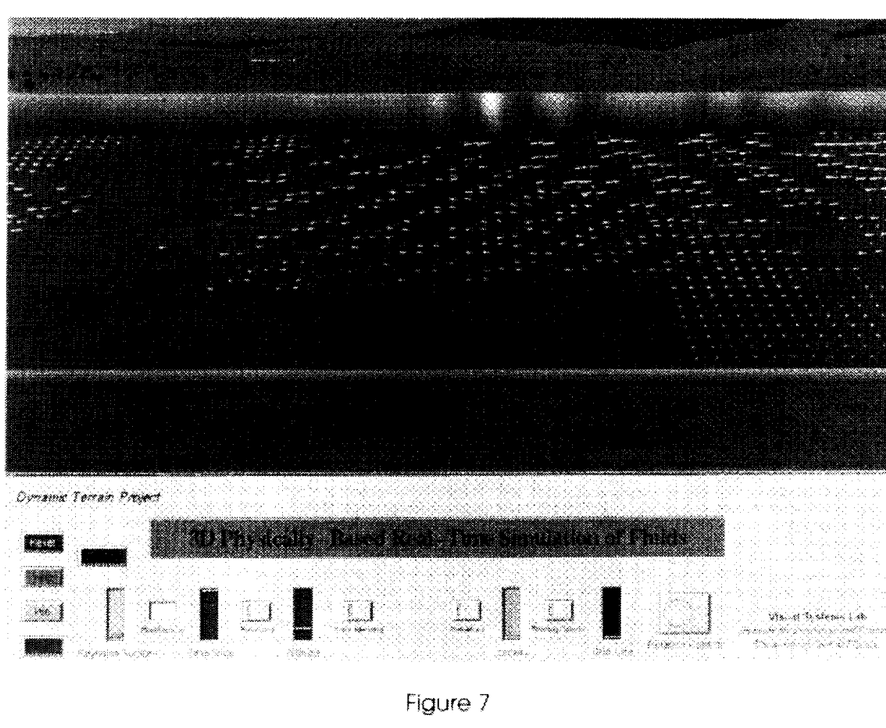
FIG. 7 shows an animation frame of velocity vectors of the fluid flow field.

For example, given a boundary condition of a channel flow, a frame of the animation of the velocity field appears as shown in FIG. 7. In FIG. 7 the velocity vectors of the fluid flow field are shown. The vectors are raised to the height proportional to the pressure. Using color drawings, the yellow colors represent that the vector heights that are above zero. The blue colors represent the heights of the vectors that are below zero. Finally, white color which is rarely present, represents the heights equal to zero.

Figure 8:
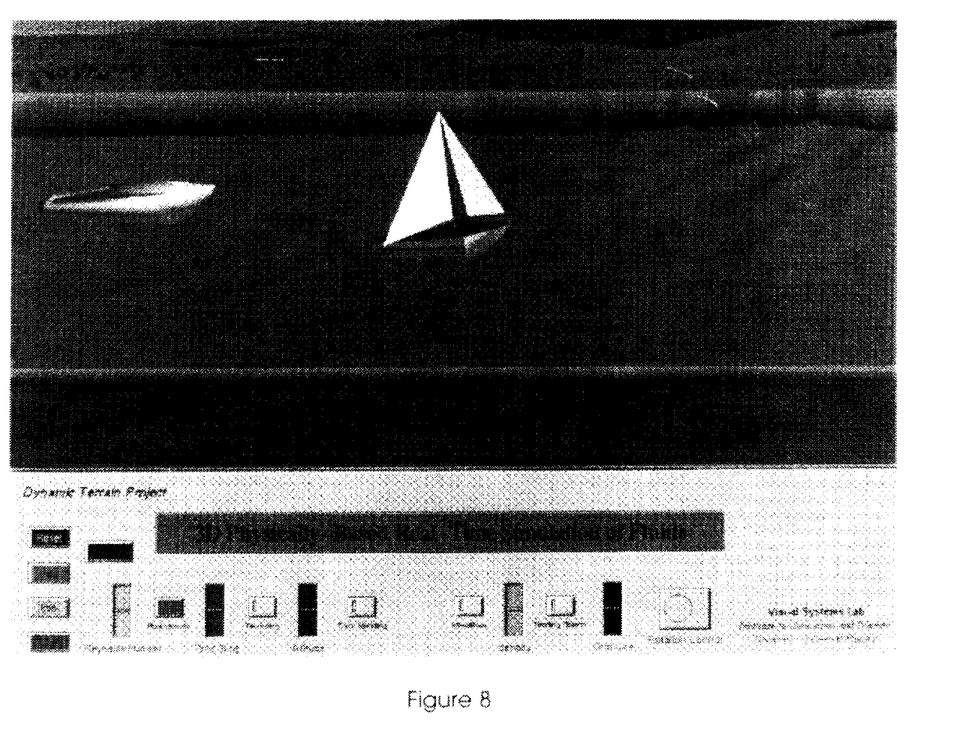
FIG. 8 shows an animation frame of a 3D fluid flow.

By shading and lighting the surface of the flow field, one can have a frame of the animation of the channel flow as shown in FIG. 8. Here, the shaded surface of the raised velocity vectors is shown which is the surface of the fluid flow. When the surfaces are animated in realtime, one can see the fluid flow in the channel.

The movie and advertising industries can use this invention to their advantage for very complex scenery and for fine grain resolution requirements because computational costs would be considerably reduced over present methods. It would be advantageous to use this invention when producing single picture snapshots of fluids, sequences of fluids or continuous depictions of fluids.

Simulated training systems in the military and commercial markets can use simulated fluid behavior for any educational purpose.

Likewise, virtual reality games and entertainment experiences are increasingly using 3D simulations of physical processes.

Scientific research and experimentation can find use for this invention to examine the surface behavior of fluids.

The units (such as newtons, meters, etc.) referred to in the above equations are merely for illustrative purposes only. The user can clearly modify these units according to the desired inputs and outputs.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim as our invention:

1. A method for generating a three-dimensional(x, y, z) animation model on a computer that simulates a fluid flow and displaying the simulated fluid flow on a three dimensional graphics display, comprising the steps of:

(a) forming a two dimensional (x and y) representation grid that models a liquid fluid flow on a computer;

(b) calculating pressure values, p, along the two dimensional representation grid, wherein the pressure values, p, are proportional to a third dimensional representation z, by solving differential equations that includes:

$p^{n+1}_{i,j} = (\Delta^1_x u^{n+1}_{i,j} + \Delta^1_y v^{n+1}_{i,j})/\epsilon$, where i, j are respective x, y mesh coordinates, n+1 represents next state, and "$\epsilon$" is a constant less than 1 and greater than 0; and $\Delta_x^1 f_{l;m} = \frac{1}{\Delta x} (f_{l+1/2;m} - f_{l-1/2;m})$, $\Delta_y^1 f_{l;m} = \frac{1}{\Delta y} (f_{l;m+1/2} - f_{l;m-1/2})$, $\nabla_h^2 f_{l;m} = \Delta_{xx} f_{l;m} + \Delta_{yy} f_{l;m}$, $\Delta_{xx} f_{l;m} = \frac{f_{l+1;m} - 2f_{l;m} + f_{l-1;m}}{\Delta x^2}$, $\Delta_{yy} f_{l;m} = \frac{f_{l;m+1} - 2f_{l;m} + f_{l;m-1}}{\Delta y^2}$, and
where f means either u, v or p, u is velocity in the direction of the x axis represented as meter per seconds, v is velocity in the direction of the y axis represented as meter per seconds, p is the pressure of fluid represented as newton per square meter, and terms l and m are arbitrary mesh coordinates in two-dimensions; and (c) displaying the two dimensional(x, y) and three dimensional(z) representations on a graphics display, wherein an animated three dimensional model of the liquid fluid flow is formed.

2. The method for generating three dimensional animation display model of claim 1, wherein the step of calculating pressure values further includes:

calculating pressure and velocity values at interior surfaces of a border that surrounds the liquid fluid flow which are exterior boundaries to the liquid fluid flow.

3. The method for generating three dimensional animation display model of claim 2, wherein the step of calculating pressure values further includes:

calculating pressure and velocity values at internal obstructions within the liquid fluid flow which are interior boundaries to the liquid fluid flow.

4. The method for generating three dimensional animation display model of claim 1, wherein the step of calculating further includes:

solving the equations:

$u^{n+1}_{i+1/2,j} = \left( u^n_{i+1/2,j} - a^n_{i+1/2,j} - \Delta_x^1 p^n_{i+1/2,j} + \frac{1}{Re} \nabla_h^2 u^n_{i+1/2,j} \right) * \Delta t$, $v^{n+1}_{i,j+1/2} = \left( v^n_{i,j+1/2} - b^n_{i,j+1/2} - \Delta_y^1 p^n_{i,j+1/2} + \frac{1}{Re} \nabla_h^2 v^n_{i,j+1/2} \right) * \Delta t$, where i, j are respective x, y mesh coordinates, n represents current state, n+1 represents the next state, $\epsilon$ is a constant less than 1 and greater than 0, $\Delta t$ represents the time between current state and next state, and Re is $\frac{VL}{v}$ where L and V are a characteristic length and velocity, respectively, and v is the kinematic viscosity; and $\Delta_x^1 f_{l;m} = \frac{1}{\Delta x} (f_{l+1/2;m} - f_{l-1/2;m})$, $\Delta_y^1 f_{l;m} = \frac{1}{\Delta y} (f_{l;m+1/2} - f_{l;m-1/2})$, $\nabla_h^2 f_{l;m} = \Delta_{xx} f_{l;m} + \Delta_{yy} f_{l;m}$, $\Delta_{xx} f_{l;m} = \frac{f_{l+1;m} - 2f_{l;m} + f_{l-1;m}}{\Delta x^2}$, $\Delta_{yy} f_{l;m} = \frac{f_{l;m+1} - 2f_{l;m} + f_{l;m-1}}{\Delta y^2}$, and
where f means either u, v or p, and terms l and m are arbitrary mesh coordinates in two-dimensions.

5. A method for generating a three-dimensional(x, y, z) fluid flow animation model from a two dimension(x,y) representation of a fluid flow field on a computer and displaying the animation model of the three-dimensional(x, y, z) fluid flow on a graphics display, comprising the steps of:

(a) providing a fluid flow within a border to form a fluid flow field, the fluid flow field having two dimensional(x and y) coordinates, wherein interior surfaces of the border are external boundaries to the fluid flow field, and where internal obstructions within the fluid flow field are interior boundaries to the fluid flow field;

(b) calculating velocity and pressure values at external boundaries of the fluid flow field from the two dimensional(x,y) coordinates on a computer-processor;

(c) calculating velocity and pressure values at internal obstruction boundaries of the fluid flow field from the two dimensional(x,y) coordinates on the computer-processor, wherein the velocity and the pressure values of the external obstruction boundaries and the velocity and the pressure values of the internal obstruction boundaries are calculated by solving the equations:

$p^{n+1}_{i,j} = (\Delta^1_x u^{n+1}_{i,j} + \Delta^1_y v^{n+1}_{i,j})/\epsilon$, where i, j are respective x, y mesh coordinates, n+1 represents next state, and $\epsilon$ is a constant less than 1 and greater than 0; and $\Delta_x^1 f_{l;m} = \frac{1}{\Delta x} (f_{l+1/2;m} - f_{l-1/2;m})$, -continued $$\Delta_y^1 f_{l;m} = \frac{1}{\Delta y} (f_{l;m+1/2} - f_{l;m-1/2}), \text{ and}$$

where f means either u, v or p,
- u is velocity in the direction of the x axis represented as meter per seconds,
- v is velocity in the direction of the y axis represented as meter per seconds,
- p is the pressure of fluid represented as newton per square meter, and terms
- l and m are arbitrary mesh coordinates in two-dimensions;

(d) repeat steps (a) and (b) when external boundaries are updated;

(e) repeat steps (a) and (c) when internal boundaries are updated; and (f) displaying the external boundaries and the internal boundaries of the fluid flow field on a graphics display, wherein the calculated pressure and velocity values represent third dimension coordinates, z.

6. The method for producing three-dimensional fluid flow animation model of claim 5, wherein the external boundaries of the fluid flow field are chosen from one of:

a riverbank, a flexible plastic wall and a blood vessel wall.

7. The method for producing three-dimensional fluid flow animation model of claim 5, wherein the internal obstruction boundaries include at least one of:

obstructions in the fluid flow field, objects moving with the fluid flow field, and objects moving independently on their own in the fluid flow field.

8. The method for producing three-dimensional fluid flow animation model of claim 5, wherein the internal obstruction boundaries include at least one of:

islands, posts, moving boats, and debris.

9. The method for producing a three-dimensional (x, y, z) fluid flow animation model from a two dimension(x,y) representation of a fluid flow field on a computer and displaying the animation model of the three-dimensional(x, y, z) fluid flow on a graphics display, comprising the steps of:

(a) providing a fluid flow within a border to form a fluid flow field, the fluid flow field having two dimensional(x and y) coordinates, wherein interior surfaces of the border are external boundaries to the fluid flow field, and where internal obstructions within the fluid flow field are interior boundaries to the fluid flow field;

(b) calculating velocity and pressure values at external boundaries of the fluid flow field from the two dimensional(x,y) coordinates on a computer-processor;

(c) calculating velocity and pressure values at internal obstruction boundaries of the fluid flow field from the two dimensional(x,y) coordinates on the computer-processor, wherein the velocity and the pressure values of the external obstruction boundaries and the velocity and the pressure values of the internal obstruction boundaries are calculated by solving the equations:

$$u^{n+1}_{i+1/2,j} = \left( u^n_{i+1/2,j} - a^n_{i+1/2,j} - \Delta_x^1 p^n_{i+1/2,j} + \frac{1}{Re} \nabla_h^2 u^n_{i+1/2,j} \right) * \Delta t,$$

$$v^{n+1}_{i,j+1/2} = \left( v^n_{i,j+1/2} - b^n_{i,j+1/2} - \Delta_y^1 p^n_{i,j+1/2} + \frac{1}{Re} \nabla_h^2 v^n_{i,j+1/2} \right) * \Delta t,$$

where i, j are respective x, y mesh coordinates, n represents current state, n+1 represents the next state, ε is a constant less than 1 and greater than 0, Δt represents the time between current state and next state, and Re is $$\frac{VL}{v}$$

where L and V are a characteristic length and velocity, respectively, and v is the kinematic viscosity; and $$\Delta_x^1 f_{l;m} = \frac{1}{\Delta x} (f_{l+1/2;m} - f_{l-1/2;m}),$$

$$\Delta_y^1 f_{l;m} = \frac{1}{\Delta y} (f_{l;m+1/2} - f_{l;m-1/2}),$$

$$\nabla_h^2 f_{l;m} = \Delta_{xx} f_{l;m} + \Delta_{yy} f_{l;m},$$

$$\Delta_{xx} f_{l;m} = \frac{f_{l+1;m} - 2f_{l;m} + f_{l-1;m}}{\Delta x^2},$$

$$\Delta_{yy} f_{l;m} = \frac{f_{l;m+1} - 2f_{l;m} + f_{l;m-1}}{\Delta y^2},$$

and where f means either u, v or p, and terms l and m are arbitrary mesh coordinates in two-dimensions:

(d) repeat steps (a) and (b) when external boundaries are updated;

(e) repeat steps (a) and (c) when internal boundaries are updated; and (f) displaying the external boundaries and the internal boundaries of the fluid flow field on a graphics display, wherein the calculated pressure and velocity values represent third dimension coordinates, z.

10. The method for producing a three-dimensional fluid flow animation model of claim 9, wherein the external boundaries of the fluid flow field are chosen from one of:

a riverbank, a flexible plastic wall and a blood vessel wall.

11. The method for producing a three-dimensional fluid flow animation model of claim 9, wherein the internal obstruction boundaries include at least one of:

obstructions in the fluid flow field, objects moving with fluid flow field, and objects moving independently on their own in the fluid flow field.

12. The method for producing a three-dimensional fluid flow animation model of claim 9, wherein the internal obstruction boundaries include at least one of:

islands, posts, moving boats, and debris.

13. A system of modelling a two-dimensional(x, y) liquid fluid flow for a three-dimensional(x, y, z) computer animation display, comprising:

(a) a fluid flow to be modelled, the fluid flow having external surface boundaries and internal obstruction boundaries;

(b) means for calculating pressure values and velocity values on a computer-processor at both the external surface boundaries and at the internal surface boundaries by the equations:

$p^{n+1}_{i,j} = (\Delta_x^1 u^{n+1}_{i,j} + \Delta_y^1 v^{n+1}_{i,j})/\epsilon$, where i,j are respective x,y mesh coordinates, n+1 represents next state and ε is a constant less than 1 and greater than 0; and $$\Delta_x^1 f_{l;m} = \frac{1}{\Delta x} (f_{l+1/2;m} - f_{l-1/2;m}),$$

$$\Delta_y^1 f_{l;m} = \frac{1}{\Delta y} (f_{l;m+1/2} - f_{l;m-1/2}), \text{ and}$$

where f means either u, v or p, and terms l and m are arbitrary mesh coordinates in two-dimensions; and solving the equations:

$$u_{i+1/2,j}^{n+1} = \left( u_{i+1/2,j}^n - a_{i+1/2,j}^n - \Delta_x^1 p_{i+1/2,j}^n + \frac{1}{Re} \nabla_h^2 u_{i+1/2,j}^n \right) * \Delta t,$$

$$v_{i,j+1/2}^{n+1} = \left( v_{i,j+1/2}^n - b_{i,j+1/2}^n - \Delta_y^1 p_{i,j+1/2}^n + \frac{1}{Re} \nabla_h^2 v_{i,j+1/2}^n \right) * \Delta t,$$

where i, j are respective x, y mesh coordinates, n represents current state, n+1 represents the next state, $\epsilon$ is a constant less than 1 and greater than 0, $\Delta t$ represents the time between current state and next state, and Re is $$\frac{VL}{v}$$

where L and V are a characteristic length and velocity, respectively, and v is the kinematic viscosity; and $$\Delta_x^1 f_{l;m} = \frac{1}{\Delta x} (f_{l+1/2;m} - f_{l-1/2;m}),$$

$$\Delta_y^1 f_{l;m} = \frac{1}{\Delta y} (f_{l;m+1/2} - f_{l;m-1/2}),$$

$$\nabla_{ha}^2 f_{l;m} = \Delta_{xx} f_{l;m} + \Delta_{yy} f_{l;m},$$

$$\Delta_{xx} f_{l;m} = \frac{f_{l+1;m} - 2f_{l;m} + f_{l-1;m}}{\Delta x^2},$$

$$\Delta_{yy} f_{l;m} = \frac{f_{l;m+1} - 2f_{l;m} + f_{l;m-1}}{\Delta y^2},$$

and
where f means either u, v or p, u is velocity in the direction of the x axis represented as meter per seconds, v is velocity in the direction of the y axis represented as meter per seconds, p is the pressure of fluid represented as newton per square meter, and terms l and m are arbitrary mesh coordinates in two-dimensions; and a 3D graphics display for displaying three dimensional representations of the liquid fluid flow with the external and internal boundary conditions for animation.

14. The system of modelling a two-dimensional(x, y) liquid fluid flow for a three-dimensional(x, y, z) computer animation display of claim 13, wherein the external surface boundaries are chosen from one of:

a riverbank, a flexible plastic wall and a blood vessel wall.

15. The system of modelling a two-dimensional(x, y) liquid fluid flow for a three-dimensional(x, y, z) computer animation display of claim 13, wherein the internal boundaries include at least one of:

obstructions in the fluid flow field, objects moving with the fluid flow field, and objects moving independently on their own in the fluid flow field.

16. The system of modelling a two-dimensional(x, y) liquid fluid flow for a three-dimensional(x, y, z) computer animation display of claim 13, wherein the internal boundaries include at least one of:

islands, posts, moving boats, and debris.

* * * * *